(No Model.) 2 Sheets—Sheet 1.

A. M. HALSTED.
INCUBATOR.

No. 267,422. Patented Nov. 14, 1882.

Witnesses
Harold Serrell
J. Haib

Inventor
per Augustus M. Halsted
Lemuel W. Serrell atty.

N. PETERS, Photo-Lithographer, Washington, D.C.

(No Model.) A. M. HALSTED. 2 Sheets—Sheet 2.

INCUBATOR.

No. 267,422. Patented Nov. 14, 1882.

Witnesses
Harold Serrell
J. Hait

Inventor
per Augustus M. Halsted
Lemuel W. Serrell
Atty

UNITED STATES PATENT OFFICE.

AUGUSTUS M. HALSTED, OF RYE, NEW YORK.

INCUBATOR.

SPECIFICATION forming part of Letters Patent No. 267,422, dated November 14, 1882.

Application filed March 6, 1882. (No model.)

*To all whom it may concern:*

Be it known that I, AUGUSTUS M. HALSTED, of Rye, in the county of Westchester and State of New York, have invented an Improvement in Incubators, of which the following is a specification.

This incubator contains a chamber in which water is caused to circulate by the action of a lamp, so as to maintain the necessary heat, and I employ a peculiar thermostat for regulating the temperature with great accuracy.

Figure 1:
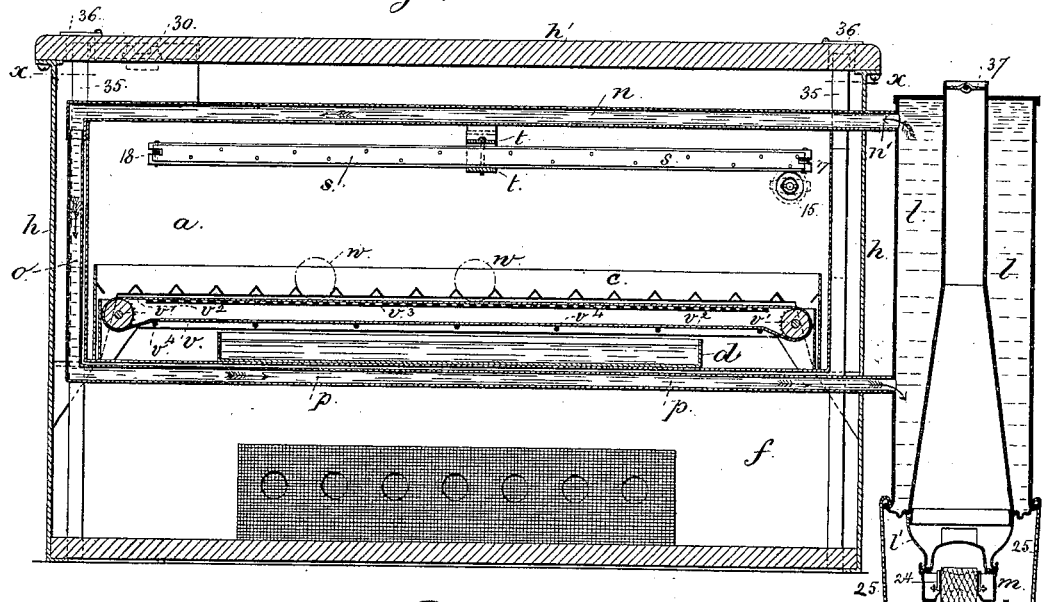
Figure 2:
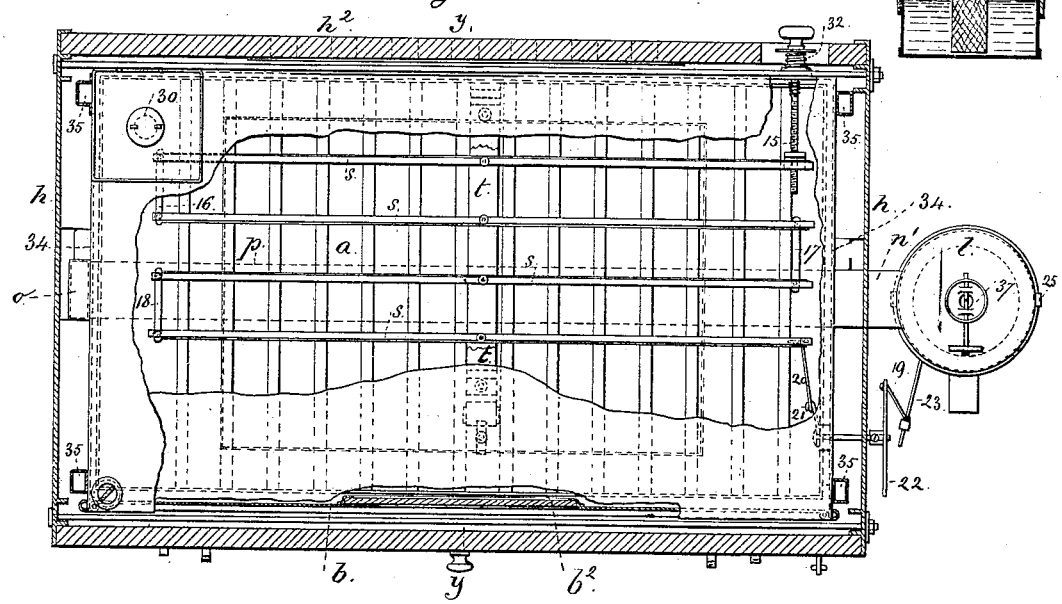
Figure 3:
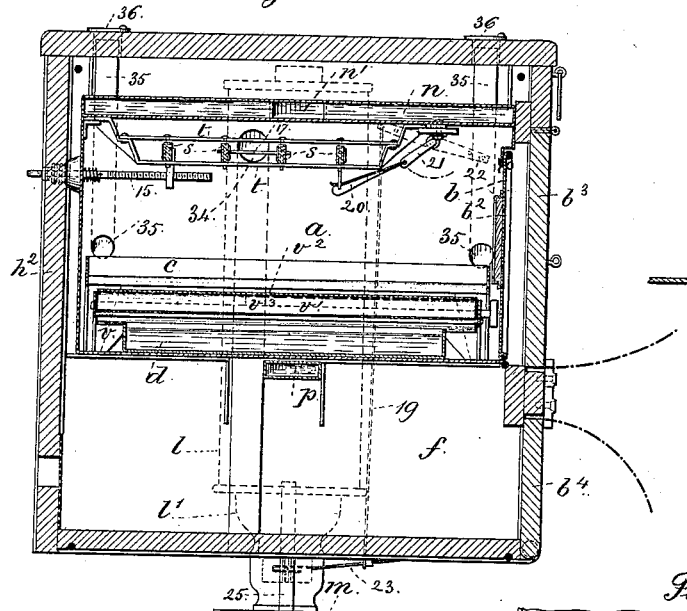
Figure 6:
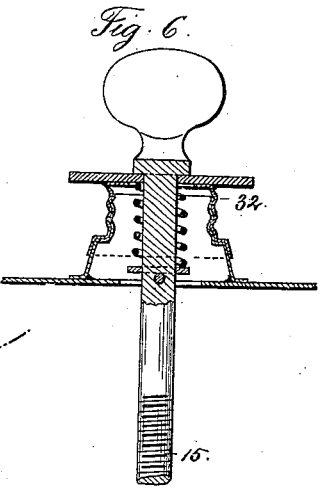
Figure 4:
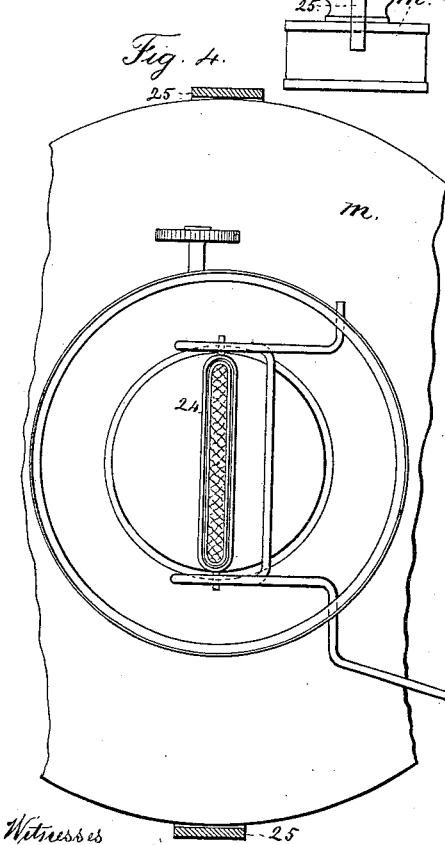
Figure 5:
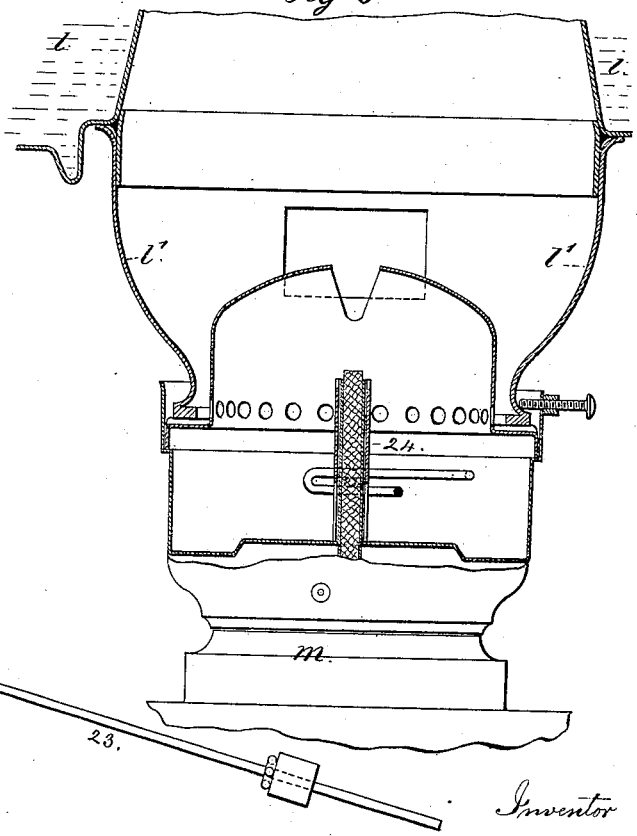

In the drawings, Figure 1 is a vertical longitudinal section of the incubator. Fig. 2 is a plan below the line $x\,x$, with portions of the water-vessel removed to show the thermostat. Fig. 3 is a cross-section of the incubator-chamber at the line $y\,y$, Fig. 2. Fig. 4 is a plan of the lamp-burner, and Fig. 5 is a vertical section of the same in large size, and Fig. 6 is a section in larger size of the sheet-metal screw-cap for the thermostat adjusting-screw.

The incubating-chamber is made of a box, $a$, with a flap or front plate, $b$, and within this is a tray, $c$, for holding the eggs. There is a pan, $d$, beneath the egg-tray for water. There is also to be a warm chamber, $f$, beneath the incubator-chamber, into which the young chickens can be placed. The flap $b$ has in it an opening, with glass or mica, $b^2$, to allow the incubating-chamber to be inspected.

The case that holds the apparatus is preferably made of wood, with ends $h$, bolted together, and to which the top $h'$ and back $h^2$ are fastened; but the ends may be of metal, and there are to be swinging fronts or flaps $b^3\,b^4$ to give access to the incubating and to the warm chambers.

It is important to be able to take out the tray of eggs and allow the egg-turning apron to remain in the incubating-chamber, so that it may be moved periodically by clock-work, if desired. With this object in view I make a frame, $v$, to hold the rollers $v'$, and employ the endless apron $v^2$, passing around such rollers and along over a support of wire cloth or grating at $v^3$, so that the apron can be drawn along between the said support of wire cloth or grating and the eggs $w$, and I place the eggs in the separate tray $c$, that is formed of the $\Lambda$-shaped cross-bars, and the cross-bars support the eggs; but when the egg-holder is placed upon the apron the eggs will rest upon the apron, but the cross-bars will descend sufficiently to allow the weight of the eggs to be taken on the apron. Hence such apron will roll the eggs when it is moved, and the cross-bars will simply keep the eggs in position. The wires or bars at $v^4$ are below the lower part of the endless apron to prevent it sagging into the water-pan $d$.

At one end of the incubator I employ an annular hot-water vessel, $l$, the same having a central flue forming a chimney to the lamp $m$, and above the incubating-chamber and between that and the top $h'$ there is a flat water-vessel, extending over the whole or nearly the whole of the chamber, as at $n$, and the upper part of the water-vessel $l$ is connected to the same by the tube $n'$.

A descending tube at $o$, at one end of the incubating-chamber, connects with the horizontal water-tube $p$, that returns the circulating water to the bottom part of the water-vessel $l$. By this construction there is a constant circulation of water, and the same is induced by the action of the heat from the lamp acting in the vessel $l$, and according to the size of the flame of the lamp, so there will be more or less heat given off and conveyed by the water to the incubating-chamber.

In the upper part of the incubating-chamber there is a peculiarly-constructed thermostat, that is very delicate in its operation and regulates the flame of the lamp in proportion to the temperature of the chamber.

I make use of three or four bars, $s$, each of which is composed of a plate of metal—such as iron or steel—riveted or fastened to a strip of vulcanite, brass, or other suitable material, so that the same assumes more or less of a curved form, according to the temperature, in consequence of the materials expanding and contracting unequally by heat. Each bar $s$ is pivoted in the middle or at any suitable intermediate place, and for this purpose there are bars $t\,t$ above and below the thermostat, said bars $t$ being supported by the top of the chamber, and the pivots of the thermostat-bars passing into these bars $t$ above and below. The bar $s$ that is next to the back is provided at one end with an adjusting-screw, 15, and at the other end is a link, 16, connecting to the next bar, and the link 17 is between the second and third bar *s*, and the link 18 is between the third and fourth bar *s*. These bars, being connected, as represented, become the same as a long thermostat-bar, and hence the movement at the link 20 is as great as required; but the thermostat occupies only a quarter of the length that would otherwise be needed, and hence can be placed in a small incubating-chamber, and the thermostat-bars are very sensitive, without being so long as to be weak and uncertain in the action.

The link 20 extends to the arm 21 of a rock-shaft that passes through the case, and is provided at the outside with a lever, 22, and a link, 19, to the lever-arm 23, that is pivoted on the burner, and at the inner end it is connected with the regulator-sleeve 24, surrounding the wick-tube.

The parts are adjusted by the screw 15 and by the place on the arm 23 where the link 19 connects therewith in such a manner that the desired temperature of the incubating-chamber is maintained. If the temperature increases, the thermostat, by expanding, acts upon the lever and the sleeve 24 to raise the same and lessen the flame, and if the temperature lessens the thermostat contracts and moves the parts that lower the sleeve and increase the flame.

The lamp is removable from the lower end of the water-heating vessel *l*, and there are springs 25, that are fastened upon the lamp and provided at their upper ends with catches that grasp over the flange around the lower end of the vessel *l*. The metallic bowl *l'* extends from the lamp-burner to the lower end of the water-vessel *l*, and in it there is an opening, with mica, so as to see the condition of the flame.

In order to fill the water-vessel and to supply any loss by evaporation, I provide a neck and screw-cap, as at 30, such cap being preferably of sheet metal. The screw that is used to adjust the thermostat passes through a movable screw-cap, 32, that is upon a screw neck or nipple soldered to the lining of the incubating-chamber. This allows for closing the hole in such lining by the screw-cap, and for easily inserting or removing the screw itself. The cross-pin which retains the screw 15 in position is within the screw-cap.

There are ventilating-tubes passing up from the bottom and opening at 34 into the incubating-chamber, and escape flues or tubes at 35, that are provided with movable covers 36 at the top to regulate the amount of opening. There is a movable damper, 37, at the top of the chimney-flue of the heating-vessel *l* to regulate the draft of the lamp.

If the improved thermostat is used in an incubator where heated air is employed instead of water, the damper or other regulating device may be moved, instead of the sleeve 24, around the wick-tube.

I claim as my invention—

1. The combination, with the heating-lamp and incubating-chamber, of two, three, or more pivoted thermostat-bars placed side by side, supports for such bars, link-connections between the alternate ends, an adjusting-screw to one extreme end of the thermostat-bars, and a connection at the other end to the heating-lamp, or a damper, substantially as set forth.

2. The combination, with the thermostat and the incubating-chamber, of an adjusting-screw, a screw-neck soldered to the lining of the incubating-chamber, and a removable screw-cap through which the adjusting-screw passes, substantially as set forth.

3. The combination, with the apron and rollers, of a movable egg-holding frame adapted to be placed over or removed from the apron, substantially as set forth.

4. The combination, with the incubating-chamber and the heating device for the same, of a thermostat within the incubating-chamber, composed of two or more bars side by side, pivots for supporting the same, and connections between one bar and the other, and an adjustment for regulating the action of the thermostat on the heating device, substantially as set forth.

Signed by me this 28th day of February, A. D. 1882.

A. M. HALSTED.

Witnesses:
GEO. T. PINCKNEY,
WILLIAM G. MOTT.